United States Patent
Garg et al.

(10) Patent No.: US 12,468,902 B2
(45) Date of Patent: Nov. 11, 2025

(54) SYSTEMS AND METHODS FOR AUTOMATED RESPONSE TO NATURAL LANGUAGE INSTRUCTIONS

(71) Applicant: The Board of Trustees of the Leland Stanford Junior University, Stanford, CA (US)

(72) Inventors: Divyansh Garg, Stanford, CA (US); Skanda Vaidyanath, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 294 days.

(21) Appl. No.: 18/172,969

(22) Filed: Feb. 22, 2023

(65) Prior Publication Data

US 2023/0267284 A1   Aug. 24, 2023

Related U.S. Application Data

(60) Provisional application No. 63/268,364, filed on Feb. 22, 2022.

(51) Int. Cl.
  *G06F 40/00* (2020.01)
  *G06F 40/216* (2020.01)
  (Continued)

(52) U.S. Cl.
  CPC .......... *G06F 40/44* (2020.01); *G06F 40/216* (2020.01); *G06F 40/30* (2020.01); *G06N 3/045* (2023.01); *G06N 20/00* (2019.01); *G06N 20/20* (2019.01)

(58) Field of Classification Search
  CPC ........ G06F 40/216; G06F 40/30; G06F 40/35; G06F 40/44; G06F 40/00; G06F 40/10;
  (Continued)

(56) References Cited

U.S. PATENT DOCUMENTS

| | | | |
|---|---|---|---|
| 11,651,162 B2* | 5/2023 | Gadde | H04L 51/02 704/9 |
| 11,989,523 B2* | 5/2024 | Gadde | G06F 40/295 |

(Continued)

FOREIGN PATENT DOCUMENTS

| | | |
|---|---|---|
| CN | 112809689 A | 5/2021 |
| JP | 6921022 B2 | 7/2021 |

(Continued)

OTHER PUBLICATIONS

Mees O, Hermann L, Rosete-Beas E, Burgard W. Calvin: A benchmark for language-conditioned policy learning for long-horizon robot manipulation tasks. IEEE Robotics and Automation Letters. Jun. 3, 2022;7(3):7327-34. (Year: 2022).*

(Continued)

*Primary Examiner* — Edgar X Guerra-Erazo
(74) *Attorney, Agent, or Firm* — KPPB LLP (57) ABSTRACT

Systems and methods for automated response to natural language instructions in accordance with embodiments of the invention are illustrated. One embodiment includes a method for training an agent, the method including sampling an instruction and observation pair from a dataset, predicting a skill code, using a skill predictor, based on the instruction and observation pair, predicting, for each of a plurality of timesteps, a set of one or more actions based on the predicted skill code and a state history using a policy, and updating the skill predictor and the policy based on a comparison of the predicted set of actions and the observation. In many embodiments, the trained agent can then be used to carry out natural language instructions.

12 Claims, 6 Drawing Sheets

```
Algorithm 1 Training LISA
Input: Dataset D of language-paired trajectories
Input: Num skills K and horizon H
 1: Initialize skill predictor f_φ, policy π_θ
 2: Vector Quantization op q(·)
 3: while not converged do
 4:   Sample τ = (l, {s_0, s_1, s_2...s_T}, {a_0, a_1, a_2...a_T})
 5:   Initialize S = {s_0}           ▷ List of seen states
 6:   for k = 0..⌊T/H⌋ do   ▷ Sample a skill every H steps
 7:     z ← q(f_φ(l, S))
 8:     for step t = 1..H do
 9:       a_{kH+t} ← π_θ(z, S[:-H])   ▷ Use recent H steps
10:       S ← S ∪ {s_{kH+t}}          ▷ Append last state
11:     end for
12:     Train f_φ, π_θ using objective L_LISA
13:   end for
14: end while
```

(51) Int. Cl.
*G06F 40/30* (2020.01)
*G06F 40/44* (2020.01)
*G06N 3/045* (2023.01)
*G06N 20/00* (2019.01)
*G06N 20/20* (2019.01)

(58) Field of Classification Search
CPC ...... G06F 40/20; G06F 40/205; G06F 40/211; G06F 40/237; G06F 40/242; G06F 40/247; G06F 40/253; G06F 40/268; G06F 40/263; G06F 40/274; G06F 40/279; G06F 40/284; G06F 40/289; G06F 40/295; G06N 3/02; G06N 3/04; G06N 3/042; G06N 3/044; G06N 3/0442; G06N 3/045; G06N 3/0455; G06N 3/0464; G06N 3/047; G06N 3/0475; G06N 3/048; G06N 3/088; G06N 3/0895; G06N 3/09; G06N 3/091; G06N 3/092; G06N 3/094; G06N 3/096; G06N 3/098
See application file for complete search history.

(56) References Cited

U.S. PATENT DOCUMENTS

| | | | |
|---|---|---|---|
| 2020/0342175 A1* | 10/2020 | Gadde | G06F 40/30 |
| 2021/0086353 A1 | 3/2021 | Shah et al. | |
| 2022/0147548 A1* | 5/2022 | Verma | G06Q 10/10 |
| 2023/0206004 A1* | 6/2023 | Gadde | G06F 40/35 704/9 |
| 2024/0242034 A1* | 7/2024 | Gadde | G06F 40/30 |

FOREIGN PATENT DOCUMENTS

| | | |
|---|---|---|
| WO | 2006119577 A1 | 11/2006 |
| WO | 2021231895 A1 | 11/2021 |

OTHER PUBLICATIONS

Garg et al., "LISA: Learning Interpretable Skill Abstractions from Language", Proceedings of the 39th International Conference on Machine Learning, Baltimore, Maryland, PMLR, 162, 2022, 22 pgs.

* cited by examiner

Algorithm 1 Training LISA

Input: Dataset $\mathcal{D}$ of language-paired trajectories
Input: Num skills $K$ and horizon $H$
1: Initialize skill predictor $f_\phi$, policy $\pi_\theta$
2: Vector Quantization op $\mathbf{q}(\cdot)$
3: while *not converged* do
4:     Sample $\tau = (l, \{s_0, s_1, s_2...s_T\}, \{a_0, a_1, a_2...a_T\})$
5:     Initialize $S = \{s_0\}$ ▷ List of seen states
6:     for $k = 0..\lfloor \frac{T}{H} \rfloor$ do ▷ Sample a skill every H steps
7:         $z \leftarrow \mathbf{q}(f_\phi(l, S))$
8:         for *step* $t = 1..H$ do
9:             $a_{kH+t} \leftarrow \pi_\theta(z, S[:-H])$ ▷ Use recent $H$ steps
10:             $S \leftarrow S \cup \{s_{kH+t}\}$ ▷ Append last state
11:         end for
12:         Train $f_\phi, \pi_\theta$ using objective $\mathcal{L}_{\text{LISA}}$
13:     end for
14: end while

*FIG. 6*

SYSTEMS AND METHODS FOR AUTOMATED RESPONSE TO NATURAL LANGUAGE INSTRUCTIONS

CROSS-REFERENCE TO RELATED APPLICATIONS

The current application claims the benefit of and priority under 35 U.S.C. § 119(e) to U.S. Provisional Patent Application No. 63/268,364 entitled "Systems and Methods for Automated Response to Natural Language Instructions" filed Feb. 22, 2022. The disclosure of U.S. Provisional Patent Application No. 63/268,364 is hereby incorporated by reference in its entirety for all purposes.

GOVERNMENT FUNDING STATEMENT

This invention was made with Government support under contract FA9550-19-1-0024 awarded by the Air Force Office of Scientific Research; under contracts 1522054, 1651565, and 1733686 awarded by the National Science Foundation; and under contract N00014-19-1-2145 awarded by the Office of Naval Research. The Government has certain rights in the invention.

FIELD OF THE INVENTION

The present invention generally relates to natural language processing (NLP), namely the processing of natural language queries, e.g. plain English.

BACKGROUND

Natural language processing refers to the field of enabling a computer to understand ordinary human language. NLP is useful not only for processing existing natural language documents, but also parsing queries from, and interacting with, human users. Typically, a computer is provided with natural language in the form of a text input, however optical character recognition and other techniques can be used to interpret natural language text in images or video. Further, speech recognition can be used to convert audio into text which can then be processed.

SUMMARY OF THE INVENTION

Systems and methods for automated response to natural language instructions in accordance with embodiments of the invention are illustrated. One embodiment includes a method for training an agent, the method including sampling an instruction and observation pair from a dataset, predicting a skill code, using a skill predictor, based on the instruction and observation pair, predicting, for each of a plurality of timesteps, a set of one or more actions based on the predicted skill code and a state history using a policy, and updating the skill predictor and the policy based on a comparison of the predicted set of actions and the observation.

In another embodiment, the method further includes predicting a second skill code, using the skill predictor, based on the instruction and observation pair and the state history, predicting, for each of a plurality of timesteps, a second set of one or more actions based on the second predicted skill code and the state history using the policy, and updating the skill predictor and the policy based on a comparison of predicted second set of actions and the observation.

In a further embodiment, the instruction and observation pair includes a natural language instruction and a sequence of one or more observations.

In still another embodiment, the sequence of observations includes a set of one or more state-action pairs that describe a state and a corresponding action.

In a still further embodiment, wherein predicting the skill code includes generating an instruction embedding based on the instruction of the instruction and observation pair, generating an observation embedding based on the observation of the instruction and observation pair, generating a skill embedding based on the instruction embedding and the observation embedding, and identifying a skill code from a codebook of skill codes based on the generated skill embedding.

In yet another embodiment, identifying the skill code from the codebook of skill codes is performed using a vector quantization process.

In a yet further embodiment, updating the skill predictor and the policy is based on an objective, wherein the objective comprises a behavior-cloning loss and a vector quantization loss, and wherein the vector quantization loss minimizes the conditional entropy of skill predictor embeddings given a codebook of skill embeddings.

In another additional embodiment, updating the skill predictor and the policy includes using a straight-through gradient estimator to backpropagate changes to the skill predictor.

In a further additional embodiment, a method for enabling a machine to act upon natural language instructions includes obtaining a plurality of instruction and observation pairs, generating language embeddings for each instruction in the plurality of instruction and observation pairs using a language encoder, generating observation embeddings for each observation in the plurality of instruction and observation pairs, predicting a set of skill codes for each given pair in the plurality of instruction and observation pairs based on a given language embedding and a given observation embedding generated from the given pair using a skill predictor, predicting an action to correctly resolve the instruction of the given pair using a policy based on the set of skill codes, and controlling a device to perform the predicted action.

In another embodiment again, a system for enabling a machine to act upon natural language instructions, including a processor, a controllable device; and
a memory, comprising a natural language processing application that configures the processor to: obtain a plurality of instruction and observation pairs, generate language embeddings for each instruction in the plurality of instruction and observation pairs using a language encoder, generate observation embeddings for each observation in the plurality of instruction and observation pairs, predict a set of skill codes for each given pair in the plurality of instruction and observation pairs based on a given language embedding and a given observation embedding generated from the given pair using a skill predictor, predict an action to correctly resolve the instruction of the given pair using a policy based on the set of skill codes, and control the controllable device to perform the predicted action.

In a further embodiment again, the set of skill codes are human interpretable.

In still yet another embodiment, vector quantization is used to translate the predicted set of skill codes into enumerated skill codes from a digital codebook.

In a still yet further embodiment, the controlled device is a robot.

In still another additional embodiment, the controlled device is an autonomous vehicle.

In a still further additional embodiment, the controlled device is a virtual avatar.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Artificial agents find it challenging to follow natural language instructions effectively in complex environments such as in applications of robotics, autonomous driving, etc. Systems and methods descried herein enable agents to effectually use natural language (e.g. plain English) to perform complex, long-horizon tasks more effectively than previous NLP systems. In various embodiments, the systems and methods described herein are uniquely suited to work on very complex tasks composed of simpler instructions, such as (but not limited to) specifications using recipes or instruction manuals. Such tasks typically require fewer amounts of data and show better generalization to different language instructions. Moreover, systems and methods described herein can enable human interpretability of the behavior of artificial agents. For example, in various embodiments it is possible for a human to understand what an artificial agent is going to do in different conditions and modulate its behavior, thereby stopping the system from making a mistake. These can be crucial for making robotics systems safe and deployable in the real world and ensuring they don't cause accidents or human injuries.

Ideally, intelligent agents should be effectually able to utilize natural language instructions to solve a variety of complex tasks in an environment and generalize to novel scenarios. While it is possible to condition on the entire language instruction directly, such an approach can suffer from generalization issues and typically does not work well without the availability of large amounts of data. To encode complex instructions and generalize to unseen ones, systems and methods discussed herein implement a new hierarchy referred to as Learning Interpretable Skill Abstractions (LISA). LISA is a hierarchical learning framework that can learn diverse, interpretable skill abstractions from language-conditioned demonstrations of behavior. LISA learns an intermediate language protocol from natural language, which is comprised of a sequence of learned discrete codes. In many embodiments, these codes can easily be interpreted by a human. i.e., the intermediate language is not a black box to the human user as is often the case with machine learning models. This enables additional insight into the model's neural network policy as specific known codes can be used to probe it instead of the much higher dimensionality dataset of possible natural language inputs. Each such codes can be referred to as a "skill abstraction"; or simply "skill".

Instead of directly passing natural language instructions to an agent, in numerous embodiments LISA passes a sequence of learned codes to the agent to obtain the desired behavior. In various embodiments, LISA is end-to-end trainable. LISA can learn a language protocol that automatically decomposes complex language instructions into a sequence of the actual physical skills that are required to solve a task. E.g., in order to solve robotic manipulation tasks, ciphers that correspond to very different physical behavior like "close a drawer", "pick a mug", etc. can be used which are required to solve a full task comprised of various subgoals. Moreover, learned codes can be highly correlated with language instructions and the behavior of the learned policy. In navigation and robotic manipulation environments, LISA outperforms a strong non-hierarchical baseline in the low data regime and is able to compose the learned skills codes to solve tasks containing unseen long-range instructions. Thus, LISA forms a novel and more natural way to condition on language in sequential decision-making problems and achieves interpretable and controllable behavior with the learned skills. Natural language processing systems implementing the LISA framework are discussed below.

LISA Systems

LISA systems are computational platforms implementing a model that conforms to the LISA framework to control connected devices. In many embodiments, the connected device is the same device on which the model is running. In various embodiments, the connected device is a robot. In numerous embodiments, the connected device is an autonomous vehicle. However, as can readily be appreciated, almost any device configured to accept commands can be controlled as a connected device as described herein.

Figure 1:
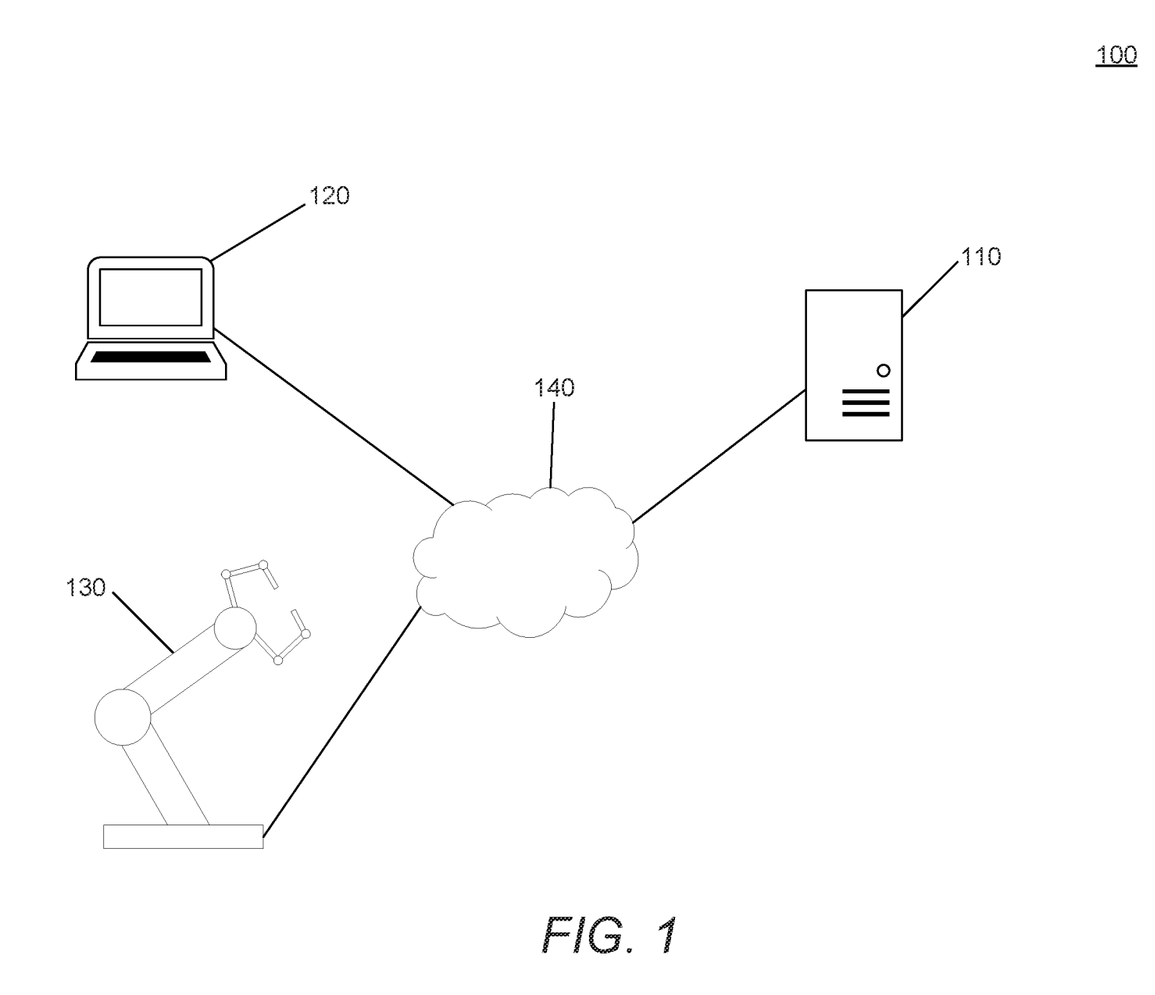
FIG. 1 illustrates a natural language processing system implementing LISA in accordance with an embodiment of the invention.

Turning now to FIG. 1, a system diagram for an NLP system implementing LISA in accordance with an embodiment of the invention is illustrated. System 100 includes natural language processor 110. In many embodiments, the natural language processor is a server, however personal computers, smart phones, tablet computers, server clusters, and/or any other computing device can be used as appropriate to the requirements of specific applications of embodiments of the invention. An input device 120 is used to interface with the natural language processor 110. In various embodiments, the natural language processor has an integrated input device. In numerous embodiments, input devices accept natural language commands which are passed to the natural language processor for processing.

Actions to be taken based on the natural language command input are estimated by the natural language processor which in turn can direct appropriate connected devices to act in accordance with the action. In system 110, a robotic arm 130 is illustrated as the connected device. However, as can readily be appreciated, any number and/or types of connected devices can be integrated into the overall system architecture as appropriate to the requirements of specific applications of embodiments of the invention. In some embodiments, the connected device is not a physical device, but a virtual device which may be running on the same hardware platform as the natural language processor and/or input device, but can also be instantiated on a separate computing platform. For example, a virtual avatar may be controlled using natural language commands.

Figure 2:
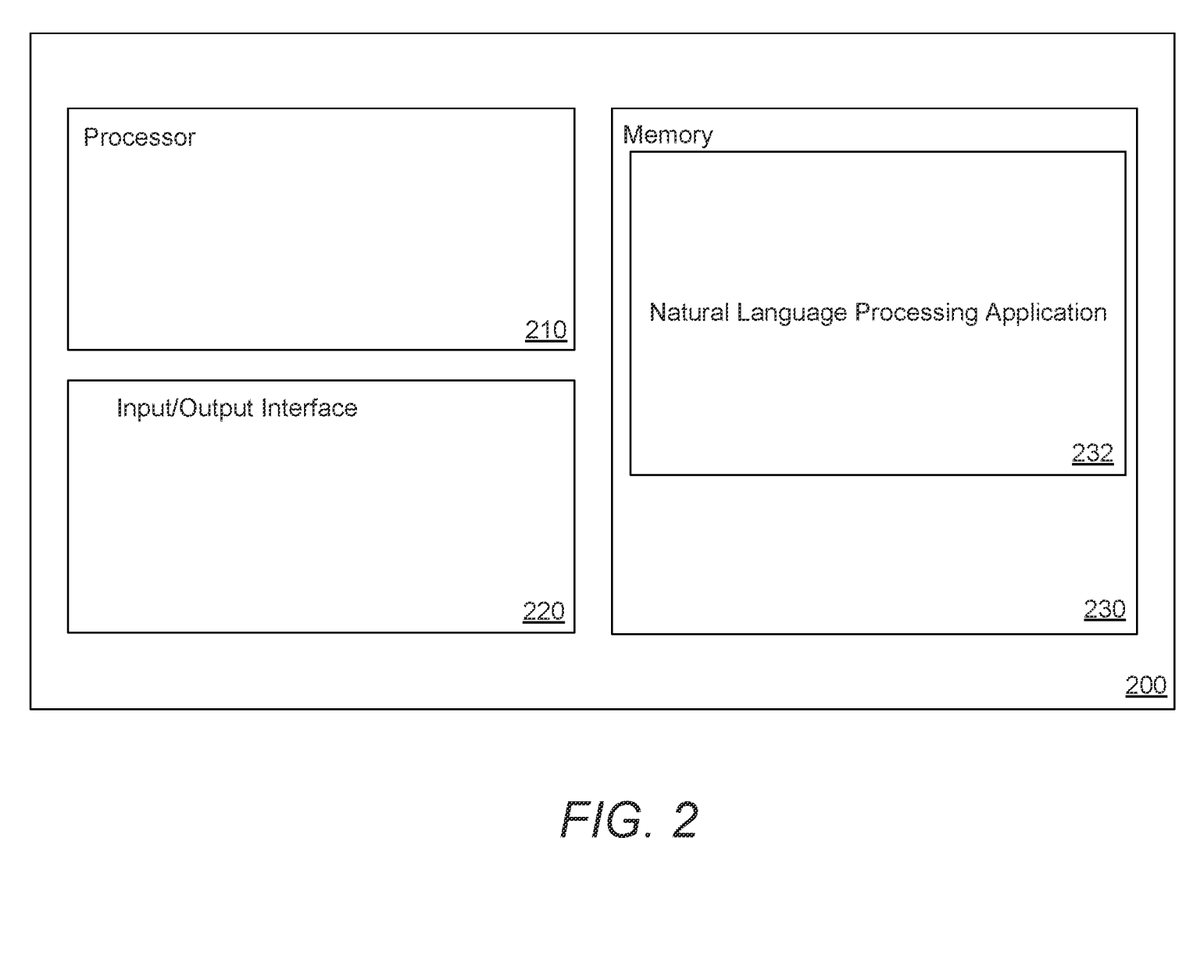
FIG. 2 illustrates a natural language processor in accordance with an embodiment of the invention.

Turning now to FIG. 2, a block diagram for a natural language processor in accordance with an embodiment of the invention is illustrated. Natural language processor 200 includes a processor 210. Processors can include one or more of any of (but are not limited to) central processing units (CPUs), graphics processing units (GPUs), field-programmable gate arrays (FPGAs), application-specific integrated circuits (ASICs), and/or any other logic processing circuitry as appropriate to the requirements of specific applications of embodiments of the invention. The natural language processor 200 further includes an input/output (I/O) interface capable of connecting with other devices (e.g. connected devices, input devices, etc.) via wired and/or wireless connections.

Natural language processor 200 additionally includes a memory 230. Memory can be constructed using volatile memory, nonvolatile memory, and/or a combination thereof. In various embodiments, the machine-readable medium capable of storing instructions executable by the processor. Memory 230 contains a natural language processing application 232 which implements the LISA framework. While specific architectures are discussed above with reference to FIGS. 1 and 2, any number of different computing architectures can be used to implement the LISA framework without departing from the scope or spirit of the invention. A discussion of the LISA framework is found below.

LISA Framework

The LISA Framework breaks learning behavior from language into two stages: 1) learning discrete codes z, representing skills, from the full-language instruction to decompose a given task into smaller sub-goals; and 2) learning a policy ($\pi$) conditioned only on these discrete codes. The skill predictor (f) and the policy modules are both trained end-to-end. In order to formalize the framework, multi-task environments are represented as task-augmented Markov decision processes (MDPs) with a family of difficult tasks $\mathcal{T}$. A task $\mathcal{T}_i$ can be the union of other tasks in $\mathcal{T}$. S,A represent state and action spaces, respectively. It is assumed that each task has a natural language description $l \in L$, where L represents the space of language instructions. It is further assumed that access to an offline dataset $\mathcal{D}$ of $\mathcal{N}$ trajectories obtained from an optimal policy for a variety of tasks in an environment with only their language description available. Each trajectory $\tau^i = (l_i, \{(s_1^i, a_1^i), (s_2^i, a_2^i) \ldots (s_T^i, a_T^i)\})$ consists of language description and the observations $s_t^i \in S$, actions $a_t^i \in A$ taken over T timesteps. The goal of the framework is to predict the expert actions $a_t^i$, given a language instruction and past observations. A single language instruction is assumed for an entire task, rather than separate instructions for each sub goal. Further, trajectories are not labeled with rewards.

Turning again to the two stages, the skill predictor is then formalized as f: L×S→C, and the policy as $\pi$:S×C→A. Here, C={$z^1, \ldots z^{1k}$} is a learnable codebook of K quantized skills.

Given an input $\tau = (l, \{s_t, a_t\}_{t=1}^T)$, the skill predictor f predicts a skill code at timestep t as $\tilde{z} = f(l, (s_t, s_{t-1}, \ldots))$. These codes are discretized using a vector quantization operation $q(\cdot)$ that maps a code $\tilde{z}$ to its closest codebook entry $z = q(\tilde{z})$, which can help in learning discreet codes and acts as a bottleneck on passing language information. The chosen skill code z is persisted for H timesteps where H is called the horizon. After H timesteps, the skill predictor is again invoked to predict a new skill. In many embodiments, this enforces the skill to act as a temporal abstraction, i.e. options. The policy $\pi$ predicts the action $a_t$ at each timestep t conditioned on a single skill code z that is active at that timestep. Therefore, for the policy to correctly predict the original actions, it needs to use the language information encoded in the skill codes.

Figure 3:
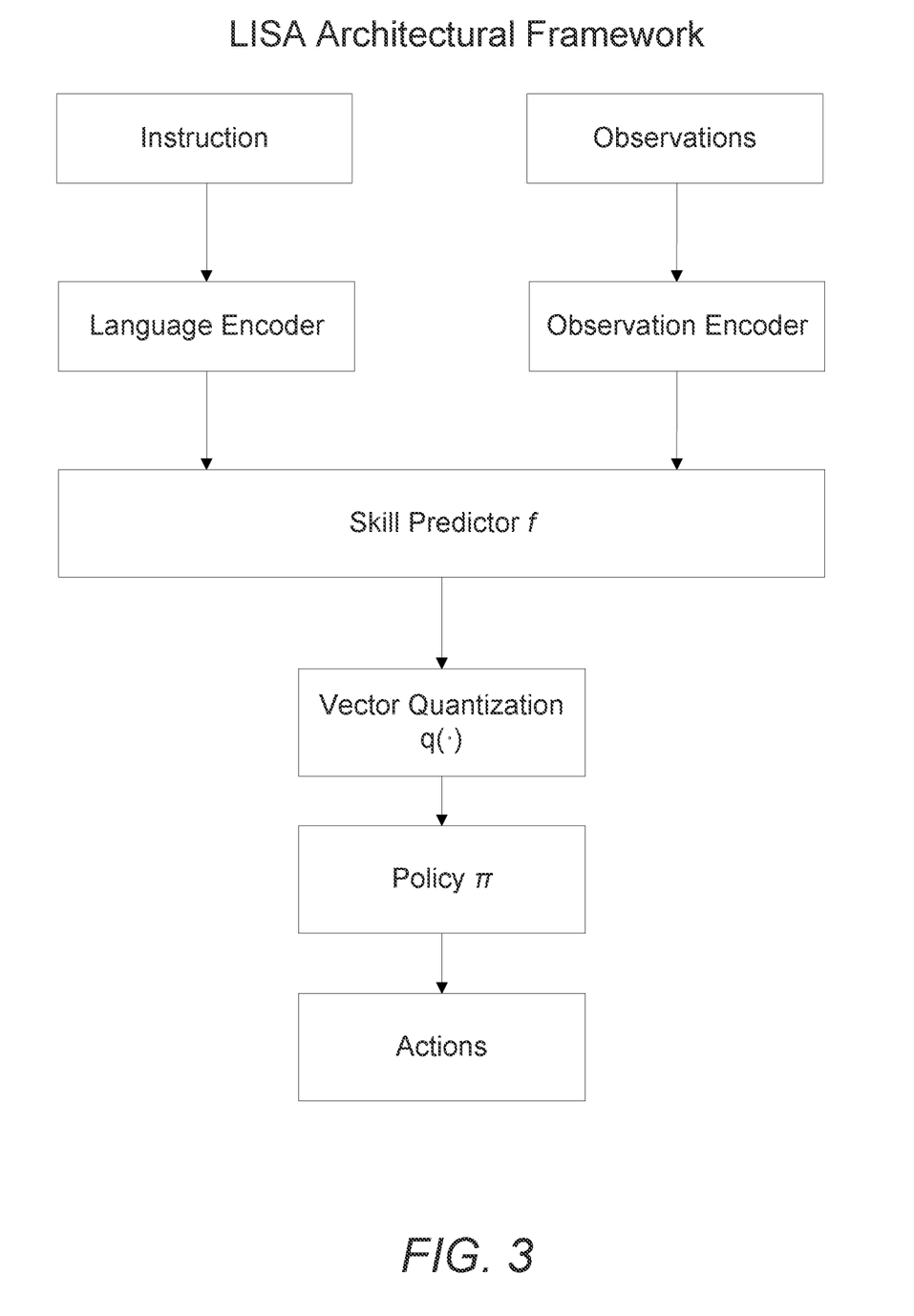
FIG. 3 is a flow chart illustrating the LISA framework architecture in accordance with an embodiment of the invention.

The quantized skill codes in the codebook are used instead of continuous embeddings as this encourages reuse and recomposing these codes together to pass information from the language input to the actual behavior. A visual representation of the LISA Framework and associated data flow in accordance with an embodiment of the invention is illustrated in FIG. 3.

Figure 4:
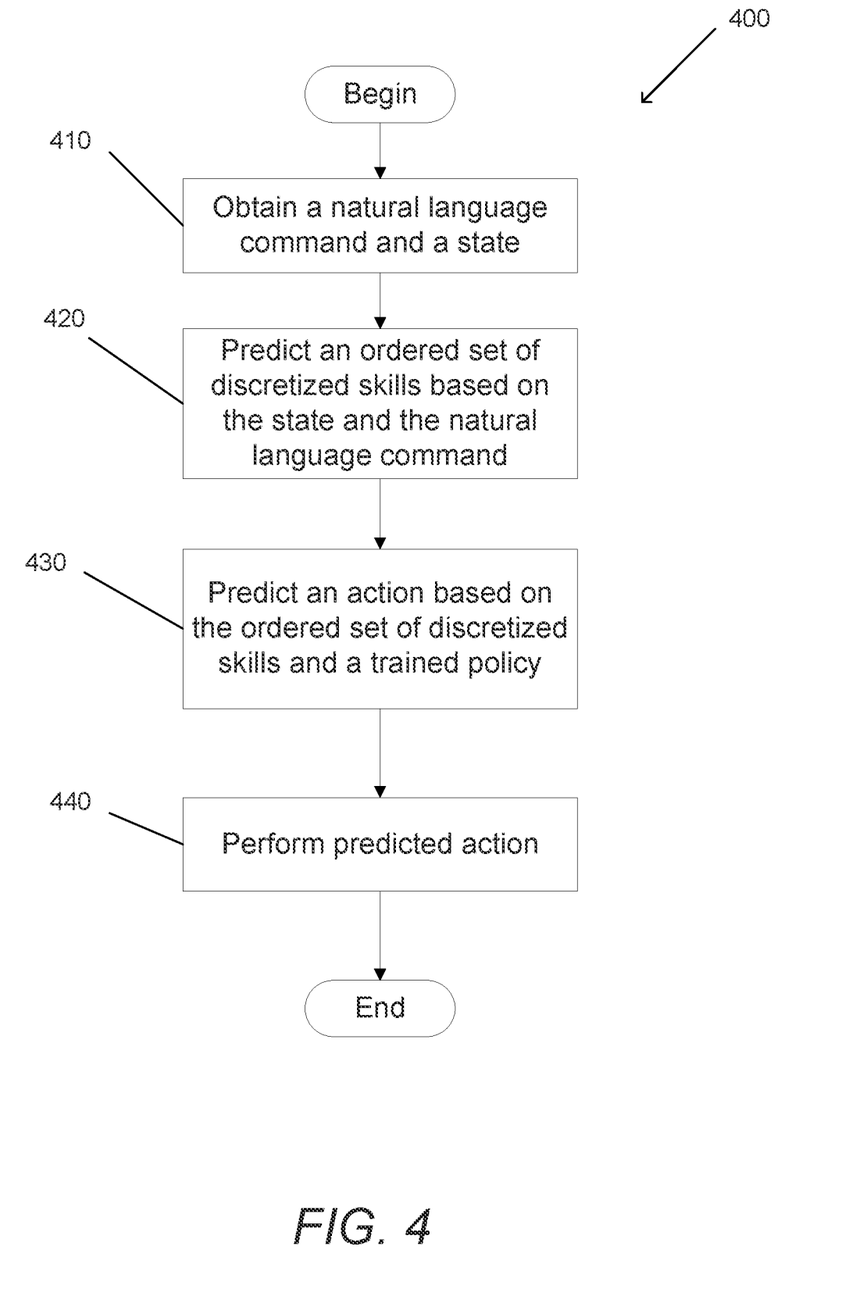
FIG. 4 is a flow chart illustrating a process for automatically acting based on a natural language instruction in accordance with an embodiment of the invention.

Turning now to FIG. 4, a flow chart illustrating a method of utilizing the LISA framework to automatically act based on a natural language command in accordance with an embodiment of the invention is illustrated. Process 400 includes obtaining (410) a natural language command and a state. The process then includes predicting (420) an ordered set of discretized skills selected from the codebook based on the natural language command. In many embodiments, the natural language command is processed using the language encoder, and the state is processed using the observation encoder. The outputs of the language encoder and observation encoder are then used by the skill predictor to predict one or more skill codes. In various embodiments, vector quantization translates the predicted skill codes into enumerated codes from the codebook. The policy is then used to predict (430) the appropriate actions based on the predicted codes. The predicted action is then performed (440). In many embodiments, the action is performed by sending a control signal to the connected device that instructs the connected device to perform the action. In many embodiments, the skills are associated with different commands that the connected device is capable of receiving. As noted above, the LISA Framework involves an end-to-end training process. This training process is described below.

Training LISA

LISA uses vector quantization (VQ) to map input signals to a low-dimensional discrete learned representation. VQ learns the codebook C={$z^1, \ldots z^{1k}$} of K embedding vectors. Given an embedding $\tilde{z}$ from the skill predictor, it maps the embedding to the closest vector in the codebook:

$$z = q(\tilde{z}) = : \underset{z^k \in C}{\operatorname{argmin}} \|\tilde{z} - z^k\|_F.$$

Back propagation through the non-differentiable quantization operation can be achieved by a straight-through gradient estimator which simply copies the gradients from the decoder to the encoder such that the model and codebook can be trained end-to-end.

The LISA Framework training process uses an objective $\mathcal{L}_{LISA} = \mathcal{L}_{BC} + \lambda \mathcal{L}_{VQ}$, where $\mathcal{L}_{BC}$ is the behavior-cloning loss on the policy $\pi_\theta$, $\lambda$ is the VQ loss weight, and $\mathcal{L}_{VQ}$ is the vector quantization loss on the skill predictor $f_\theta$ given as:

$\mathcal{L}_{VQ}(f) = \mathbb{E}_\tau[\|sg[q(\tilde{z})] - \tilde{z}\|_2^2]$, with $\tilde{z} = f_\phi(l, (s_t, s_{t-1}, \ldots))$, where $sg[\cdot]$ denotes the stop-gradient operation. $\mathcal{L}_{VQ}$ is also referred to as "commitment loss." It minimizes the conditional entropy of the skill predictor given the codebook vectors, making the embeddings stick to a single codebook vector. In many embodiments, the codebook vectors are learned using an exponential moving average update.

In many embodiments, language reconstruction via cross-entropy loss can be avoided by maximizing the mutual information between skill codes and the natural language. $\mathcal{L}_{VQ} = -H(z|l)$, where $H(l)$ is the entropy of the language. In various embodiments, the LISA framework is implemented using transformers or multilayer perceptrons (MLPs). In various embodiments, the observation encoder is made of convolution layers to generate embeddings from image observations, and MLPs are used for simple state representations. The skill predictor network can be implemented as a small Causal Transformer network that takes in the language embeddings and the observation embeddings at each time step. The language embeddings can be concatenated at the beginning of the observation embeddings before being fed into the skill predictor. The policy network can be implemented as a Casual Transformer, but without any condition on any reward signal, and instead on the skill code. The sequence length of the policy network is the horizon of the skills. While specific network architectures are enumerated here, as can readily be appreciated, any number of different network architectures can be used as appropriate to the requirements of specific applications of embodiments of the invention. In various embodiments.

Figure 5:
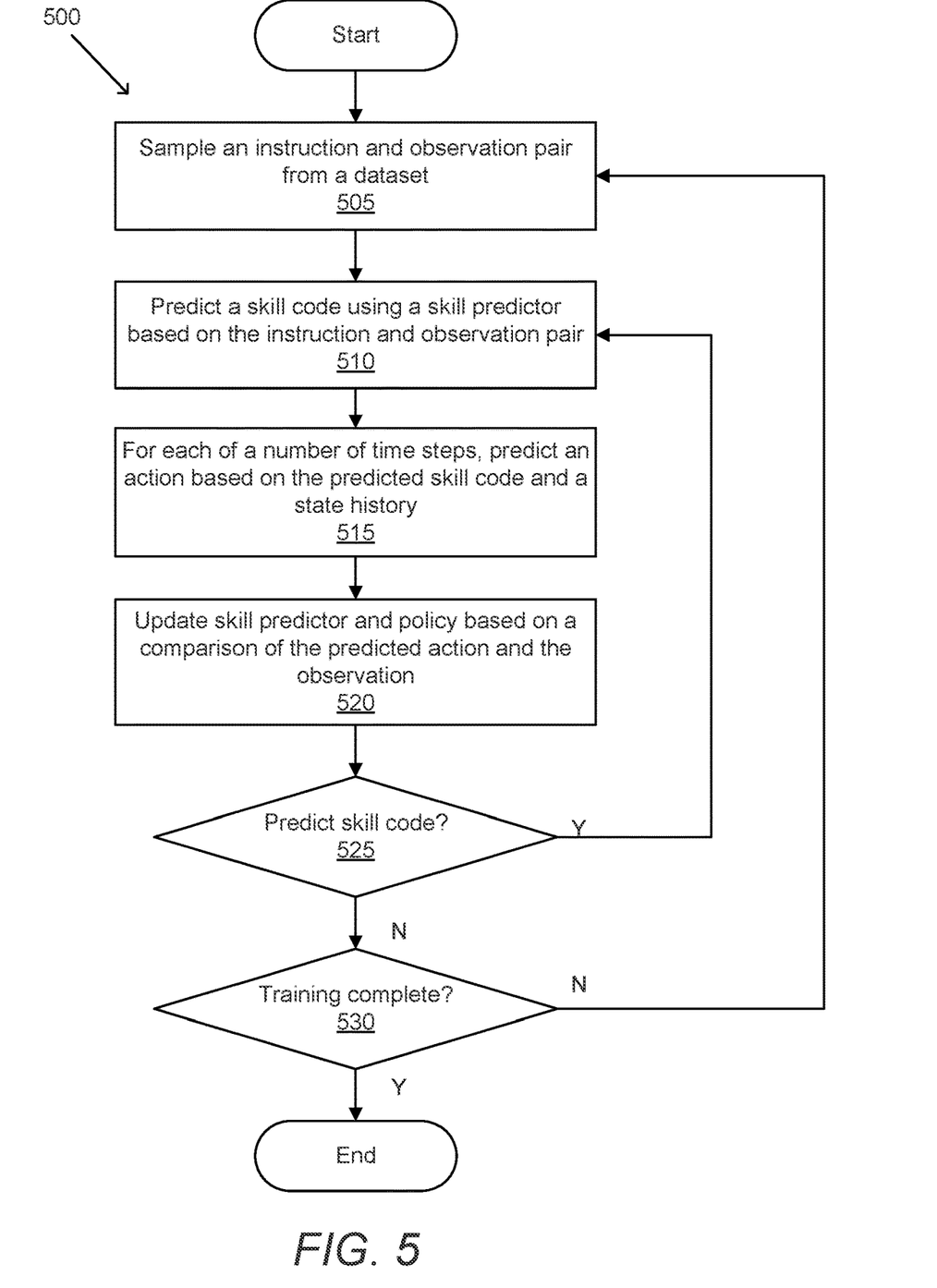
FIG. 5 is a flow chart illustrating a process for training a LISA model in accordance with an embodiment of the invention.

An example of a process for training an agent in accordance with an embodiment of the invention is illustrated in FIG. 5. Processes for training agents in accordance with several embodiments of the invention can train agents to process complex natural language instructions in order to perform complex, long-horizon tasks. Process 500 samples (505) an instruction and observation pair from a dataset. Instruction and observation pairs in accordance with several embodiments of the invention include a natural language instruction and a sequence of one or more observations. Observations in accordance with various embodiments of the invention can include state-action pairs that describe a state and a corresponding action.

Process 500 predicts (510) a skill code, using a skill predictor, based on the instruction and observation pair. Skill predictors in accordance with a number of embodiments of the invention generate skill embeddings based on embeddings from the instruction and/or observation (or a state from the observation). In several embodiments, skill embeddings can be used to select a discrete skill code from a codebook of embedding vectors. For example, processes in accordance with various embodiments of the invention select discrete skill codes by mapping a skill embedding to a closest skill embedding in the codebook. In certain embodiments, mappings can be performed using a vector quantization process.

Process 500 predicts (515), for each of a number of timesteps, an action based on the predicted skill code and a state history. In a number of embodiments, the number of timesteps is a fixed number. State histories in accordance with several embodiments of the invention include a current state and/or a number of previously seen states. Processes in accordance with some embodiments of the invention also update the state history for each timestep.

Process 500 updates (520) the skill predictor and policy based on a comparison of the predicted actions and the observation. In various embodiments, the predicted actions and the actions from the state-action pairs of the observation are compared to identify a loss or objective that can be used to train the skill predictor and/or policy. Objectives in accordance with some embodiments of the invention can include a behavior-cloning loss on the policy and a vector quantization loss on the skill predictor. Vector quantization losses (or commitment losses) in accordance with many embodiments of the invention can minimize the conditional entropy of skill predictor embeddings given a codebook of skill embeddings. In various embodiments, a straight-through gradient estimator can be used to backpropagate changes to the skill predictor through the non-differentiable quantization operation.

Process 500 determines (525) whether to predict a new skill code. Processes in accordance with a variety of embodiments of the invention can determine to predict a new skill code in various ways, such as (but not limited to) after a fixed number of timesteps, upon reaching a particular state, etc. When the process determines to predict a new skill code, the process returns to step 510 to predict a new skill code. Otherwise, the process proceeds to step 530.

Figure 6:
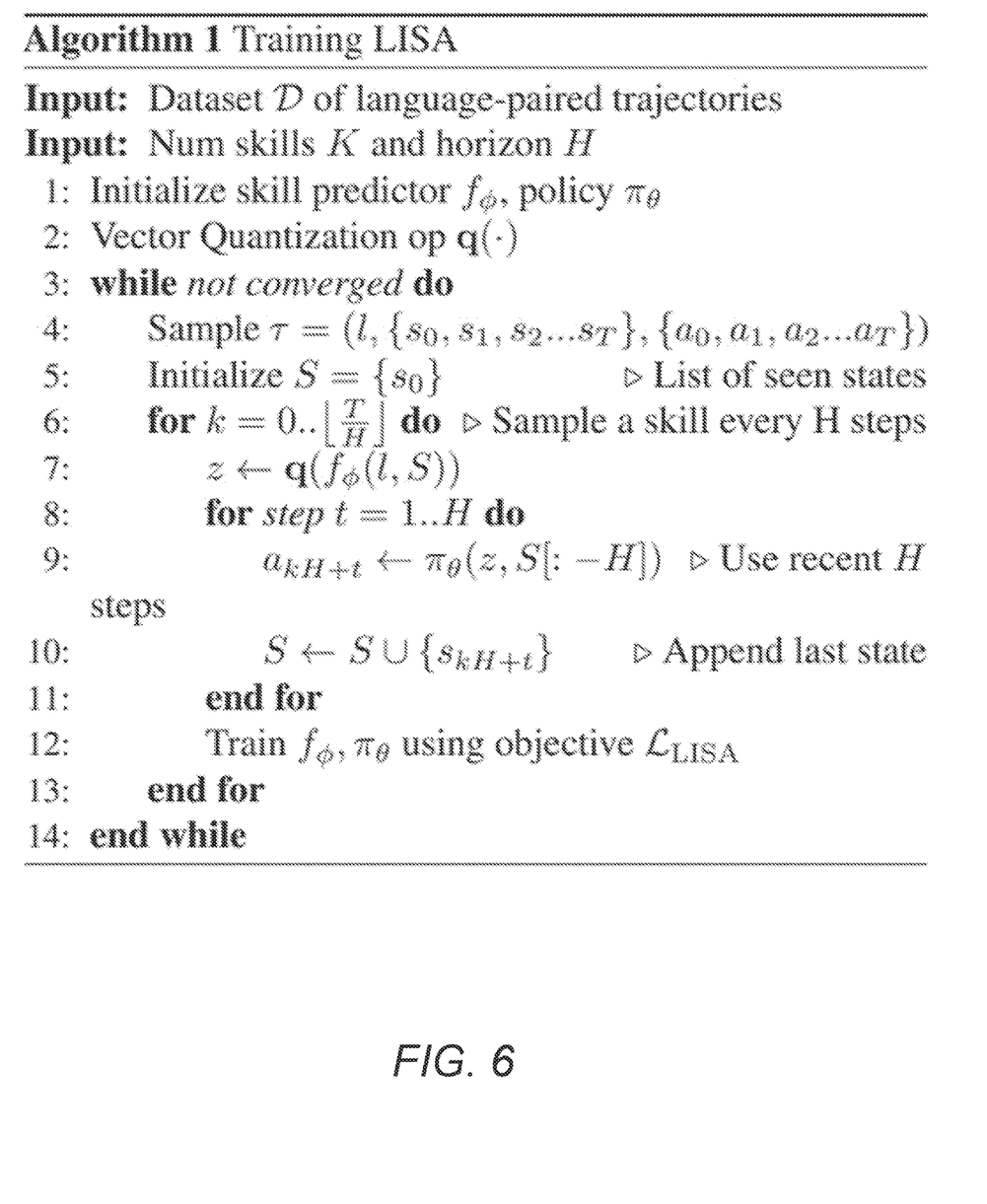
FIG. 6 is a pseudocode implementation of a LISA Framework training process in accordance with an embodiment of the invention.

Process 500 determines (530) whether the training is complete. Training in accordance with several embodiments of the invention can be determined to be complete in various ways, such as (but not limited) when a dataset is completely processed, when the models have converged, etc. When process 500 determines that training is not complete, the process returns to step 505 and samples another instruction and observation pair from the dataset. When process 500 determines that training is complete, the process ends. A pseudocode implementation of a LISA Framework training process in accordance with an embodiment of the invention is illustrated in FIG. 6.

While specific processes for training an agent are described above, any of a variety of processes can be utilized to train agents as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

What is claimed is:

1. A method for enabling a machine to act upon natural language instructions, comprising:
   obtaining a plurality of instruction and observation pairs;
   generating language embeddings for each instruction in the plurality of instruction and observation pairs using a language encoder;
   generating observation embeddings for each observation in the plurality of instruction and observation pairs;
   predicting a set of skill codes for each given pair in the plurality of instruction and observation pairs based on a given language embedding and a given observation embedding generated from the given pair using a skill predictor;
   predicting an action to correctly resolve the instruction of the given pair using a policy based on the set of skill codes; and
   controlling a device to perform the predicted action.

2. The method of claim 1, wherein the set of skill codes are human interpretable.

3. The method of claim 1, wherein vector quantization is used to translate the predicted set of skill codes into enumerated skill codes from a digital codebook.

4. The method of claim 1, wherein the controlled device is a robot.

5. The method of claim 1, wherein the controlled device is an autonomous vehicle.

6. The method of claim 1, wherein the controlled device is a virtual avatar.

7. A system for enabling a machine to act upon natural language instructions, comprising:
   a processor;
   a controllable device; and
   a memory, comprising a natural language processing application that configures the processor to:
   obtain a plurality of instruction and observation pairs;
   generate language embeddings for each instruction in the plurality of instruction and observation pairs using a language encoder;
   generate observation embeddings for each observation in the plurality of instruction and observation pairs;
   predict a set of skill codes for each given pair in the plurality of instruction and observation pairs based on a given language embedding and a given observation embedding generated from the given pair using a skill predictor;
   predict an action to correctly resolve the instruction of the given pair using a policy based on the set of skill codes; and
   control the controllable device to perform the predicted action.

8. The system of claim 7, wherein the set of skill codes are human interpretable.

9. The system of claim 7, wherein vector quantization is used to translate the predicted set of skill codes into enumerated skill codes from a digital codebook.

10. The system of claim 7, wherein the controlled device is a robot.

11. The system of claim 7, wherein the controlled device is an autonomous vehicle.

12. The system of claim 7, wherein the controlled device is a virtual avatar.

* * * * *